United States Patent [19]

Koga

[11] Patent Number: 4,884,667

[45] Date of Patent: Dec. 5, 1989

[54] AUTOMATIC CHANGE GEAR CONTROL MEANS

[75] Inventor: Hidetaka Koga, Ebina, Japan

[73] Assignee: Isuzu Motors Ltd., Tokyo, Japan

[21] Appl. No.: 222,535

[22] Filed: Jul. 20, 1988

[30] Foreign Application Priority Data

Jul. 22, 1987 [JP] Japan .................. 62-181158
Jul. 22, 1987 [JP] Japan .................. 62-181159

[51] Int. Cl.$^4$ ............................................. B60K 20/16
[52] U.S. Cl. ............................... 192/3.55; 192/0.092;
  192/3.51; 192/3.58; 74/330; 74/336 R
[58] Field of Search .............. 192/0.096, 3.51, 0.03,
  192/0.032, 0.092, 0.098, 0.076; 74/330, 331,
  325, 333, 334, 356, 359, 360; 92/0.084, 3.55,
  3.56, 3.57, 3.58

[56] References Cited

U.S. PATENT DOCUMENTS

| | | | |
|---|---|---|---|
| 2,991,661 | 7/1961 | Rambausek | 74/330 |
| 3,691,861 | 9/1972 | Stürmer | 74/333 X |
| 4,463,621 | 8/1984 | Fisher | 74/330 |
| 4,497,222 | 2/1985 | Nagaoka et al. | 192/0.692 X |
| 4,519,484 | 5/1985 | Nagaoka et al. | 74/330 X |
| 4,579,015 | 4/1986 | Fukui | 74/360 X |
| 4,658,663 | 4/1987 | Hiraiwa | 74/359 |
| 4,677,880 | 7/1987 | Hattori et al. | 192/0.092 X |

FOREIGN PATENT DOCUMENTS 60-11754 1/1985 Japan .
63-26452 2/1988 Japan .

Primary Examiner—Leslie A. Braun
Assistant Examiner—Nicholas White
Attorney, Agent, or Firm—Browdy and Neimark

[57] ABSTRACT

In an automatic transmission for obtaining a necessary transmission gear ratio by disposing a plurality of gear trains on an input shaft 8 and an output shaft 19 which are parallel to each other, the present invention disposes two electromagnetic multiple-disk clutches $C_1$ (or $C_2$) and $C_5$ (transmitting torque varying means) between the input shaft 8 and the output shaft 19 so that a torque is borne by the electromagnetic multiple-disk clutch $C_5$ to make a shift operation at the time of shift-up and the torque is borne by the electromagnetic multiple-disk clutches $C_1$ (or $C_2$) and $C_5$ to make the shift operation at the time of shiftdown. Accordingly, the torque from the engine can always be kept applied to the output shaft 19 during the gear change operation, and the occurrence of non-transmission of torque as well as the shock resulting from clutch connection can be prevented. For this reason, the gear change operation can be made smoothly without giving the feel of power loss and speed loss to the driver. The present invention can be practiced by adding only two electromagnetic multiple-disk clutches to a conventional automatic transmission and by utilizing commonly all other components of the conventional automatic transmission.

34 Claims, 12 Drawing Sheets

FIG. 4 (D) (PRIOR ART)
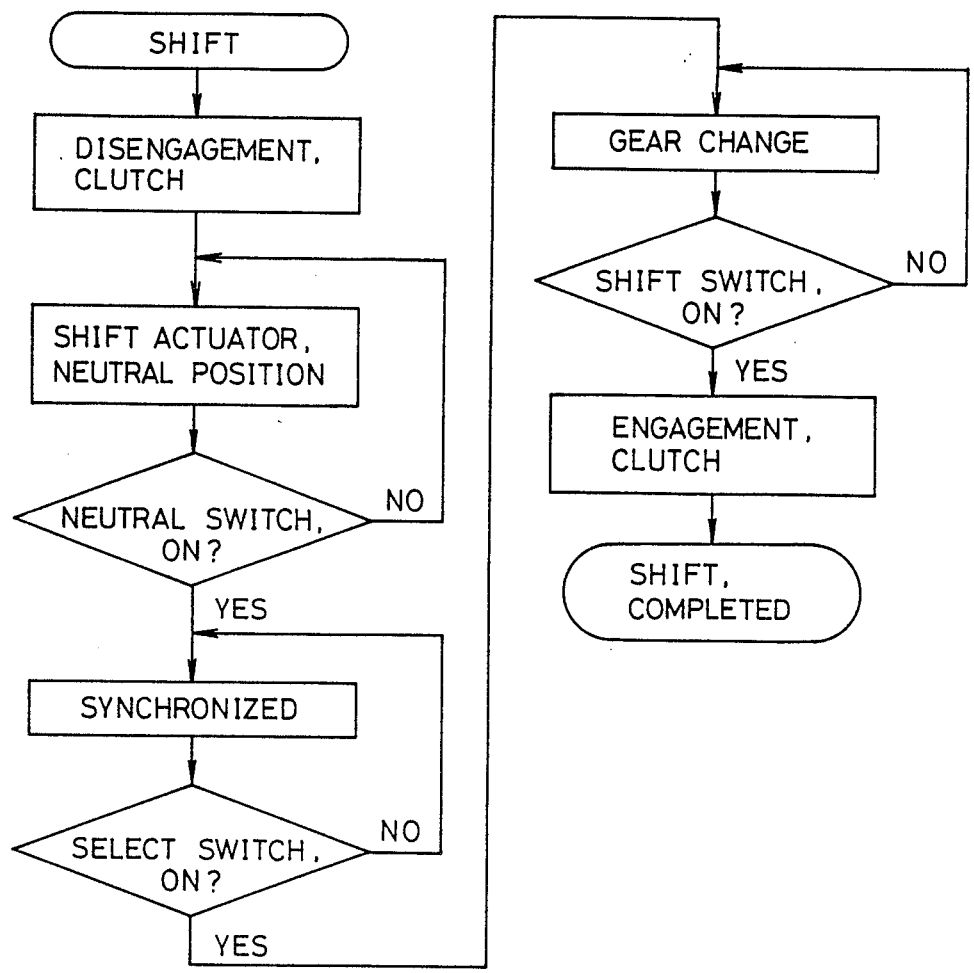

AUTOMATIC CHANGE GEAR CONTROL MEANS

BACKGROUND OF THE INVENTION

1. Field of the Invention

The present invention relates to an automatic change gear control means for controlling the gear-shifting operation of an automatic transmission of a type which employs a synchromesh type transmission.

2. Description of the Prior Art

Automatic transmissions of a type in which a synchromesh transmission usually utilized in a manual transmission is automatically controlled with a hydraulically controlled actuator and an electronic control device have been disclosed. Since the automatic transmission of the above-described type employs a synchromesh transmission, a series of operations, which consists of disengagement of the engine from the transmission, which is achieved by the disengagement of a clutch, synchronization of speeds, and connection of the clutch, must be conducted in each gear-shifting operation, thereby prolonging the time needed to shift gears. Further, while the clutch is disengaged during the gear-shifting operation, the drive force is not transferred. This temporarily creates free running (non-transmission of torque) which makes the driver feel as if the vehicle has lost power or speed and thereby makes him uncomfortable.

In order to eliminate the above-described problems, Japanese Patent Laid-Open No. 60-11764 discloses a control method for an automatic transmission. This method involves a double clutch operation in which a synchronizing load is detected during gear-shifting, and in which, when the load is too large with respect to the capacity of a synchronizing device, a clutch which has been disconnected so as to enable the gear to be shifted is once again engaged before the synchronization is performed, i.e., before gears are shifted, the clutch is then again disengaged, and synchronization is then performed. In this way, the synchronizing load is reduced before the synchronization operation is performed, and the time required for gear-shifting is therefore reduced while any asynchronization is prevented.

Even when a means for reducing the synchronizing load is incorporated in the control device of the automatic transmission, as in the above-described case, if an automatic transmission is of the type in which a five-speed transmission is automatically controlled by an actuator, the rotations of the gears are synchronized by a synchronizing device through a cone clutch, and a clutch is therefore disengaged and is then reengaged after the synchronization has been completed in each gear-shifting operation, necessitating non-transmission of torque between the engine and the transmission. Therefore, time is required for connecting and disconnecting the clutch, even when the time necessary for synchronization is reduced. Further, since the clutch is disengaged while the gears are being shifted, torque is not transmitted, making the driver feel as if the vehicle is losing power or speed.

Accordingly, the present inventor has proposed an automatic change gear control means in which an electromagnetic multiple-disk clutch is mounted on a highest gear, i.e., on a 5th gear so that it is operated when gears are shifted up so as to enable the gears to be smoothly shifted up without disengaging the clutch, and filed this patent application under Japanese Patent Laid-Open No. 63-26452 (Patent Application No. 61-166672). However, this automatic change gear control means is applied only to the up-shift of gears, and still suffers from a problem involving time lag when gears are shifted down.

Moreover, the present inventor improved the automatic change gear control means disclosed in Japanese Patent Laid-Open No. 63-26452, and developed an automatic change gear control means in which electromagnetic multiple-disk clutches are respectively mounted on the lowest speed gear, i.e., the 1st speed gear, and the highest speed gear, i.e., the 5th speed gear, and torque varying means (electromagnetic or hydraulic multiple-disk clutches) is operated when the gears are shifted either down or up so as to enable the up-shift or down-shift operation to be smoothly conducted without disengaging the clutch.

When a vehicle is driven, it is desired that the gear-shifting operations be performed quickest when a vehicle is operated at maximum acceleration after it has been started, in particular, when gears are shifted up from 1st gear to 2nd gear and when the vehicle is accelerated from a coasting state (running by force of inertia in a neutral state), e.g., when the vehicle is operated at full acceleration in 1st gear after the gears have been shifted down from 2nd to 1st. In order to satisfy the above-described desire, it is essential that the time required for the gears to be shifted between 1st gear and 2nd gear be shortened. However, the above-described automatic change gear control means has a disadvantage in that it requires four operation steps when the gears are shifted up or down between 1st gear and 2nd gear. The four up-shift steps comprise disengaging the electromagnetic multiple-disk clutch mounted on 1st gear, gradually engaging the electromagnetic multiple-disk clutch mounted on 5th gear, synchronizing the r.p.m. of an input shaft to that of 2nd gear, and shifting to 2nd gear. The four down-shift steps comprise gradually engaging the electromagnetic multiple-disk clutch mounted on 5th speed gear, disengaging 2nd gear, disengaging the electromagnetic multiple-disk clutch mounted on 5th gear, and engaging the electromagnetic multiple-disk clutch mounted on 1st gear. In consequence, it takes a long time for the above-described automatic change gear control means to perform gear-shifting. In order to solve this problem, an automatic change gear control means incorporating a one-way clutch in a gear train thereof has been developed.

SUMMARY OF THE INVENTION

In view of the above-described problems of the prior art, a primary object of the present invention is to provide an automatic change gear control means for a synchromesh type automatic transmission which enables up-shift and down-shift to be performed in a state where a clutch is engaged so as to perform up-shift and down-shift operations smoothly, and which is therefore capable of shortening the time required for gear-shifting and preventing non-transmission of torque from occurring during gear-shifting operation which would otherwise make the driver feel a time lag caused by gear-shifting.

Another object of the present invention is to provide an automatic change gear control means having a control means which has a transmitting torque varying means in a highest speed gear, and in which, when gears are shifted up, torque is loaded to the transmitting torque varying means, the amount of torque loaded to the transmitting torque varying means being gradually increased, and the torque loaded to the transmitting torque varying means being released after gear have been shifted up.

Another object of the present invention is to provide an automatic change gear control means having a control means in which transmitting torque varying means are respectively provided in a highest speed gear and a lowest speed gear, and in which, when gears are shifted down, a currently engaged gear is disengaged after the transmitting torque varying means mounted on the highest speed gear has been actuated, the transmitting torque varying means mounted on the lowest speed gear is actuated, the amount of torque loaded thereto is gradually increased, gears are shifted down, and the torque loaded to the transmitting torque varying means is released after gears have been shifted down.

Another object of the present invention is to provide an automatic change gear control means including a transmitting torque varying means which comprises a friction clutch that can vary a torque transmitted and that may be an electromagnetic multiple-disk clutch or fluid clutch, the amount of torque loaded to the transmitting torque varying means being varied for each gear combination, and the amount of torque loaded to the electromagnetic multiple-disk clutch being controlled by the amount of current that is caused to flow in an actuator thereof, whereas the amount of torque loaded to the fluid clutch is varied by the amount of oil pressure supplied to an actuator.

Another object of the present invention is to provide an automatic change gear control means for a synchromesh type automatic transmission which is capable of performing gear up-shift and down-shift operations without disengaging a clutch so as to enable the time needed to engage and disengage the clutch to be reduced, which enables a time lag caused by gear-shifting to be prevented because of the clutch being not disengaged, which enables non-transmission of torque to be prevented from occurring when gears are shifted up or down, which enables impact caused by engagement of the clutch to be eliminated, and which ensures smooth gear-shifting which does not make a driver feel as if a vehicle is losing power or speed.

Another object of the present invention is to provide an automatic change gear control means which has the same structure as that of a known synchromesh automatic transmission except that the synchronizing devices mounted on the highest speed gear and the 1st gear in the known automatic transmission are replaced by transmitting torque varying means such as electromagnetic multiple-disk clutches, and which therefore enables other parts to be used in common.

Another object of the present invention is to provide an automatic change gear control means in which transmitting torque varying means such as electromagnetic multiple-disk clutches or fluid multiple-disk clutches are respectively provided in a highest speed gear and a 2nd gear, in which, when gears are shifted up between the highest speed gear and the 2nd gear, the transmitting torque varying means mounted on the highest speed gear is actuated, and in which, when gears are shifted down, a currently engaged gear is disengaged after the transmitting torque varying means mounted on the highest speed gear has been actuated, the transmitting torque varying means mounted on the 2nd gear is actuated, and gear shift down is then performed.

Another object of the present invention is to provide an automatic change gear control means which has the same structure as that of a known synchromesh type automatic transmission except that a one-way clutch is mounted on a 1st gear train for a 1st speed range so as to enable gears to be shifted between the 1st gear and a 2nd gear smoothly and in a short period of time, that is, so as to enable shifting between the 1st gear and the 2nd gear to be performed only by engaging or disengaging a transmitting torque varying means mounted on the 2nd gear such as an electromagnetic multiple-disk clutch and thereby enable a gear-shifting operation to be performed smoothly and in a short period of time when a vehicle is operated at maximum acceleration after it has started, e.g., when gears are shifted up from the 1st gear to the 2nd gear or when the vehicle is accelerated at maximum power from a coasting state, e.g., when the vehicle is accelerated in the 1st gear after the gears have been shifted down from the 2nd gear to the 1st gear.

Another object of the present invention is to provide an automatic change gear control means in which a vehicle is driven in a 1st speed range by a one-way clutch, and is therefore driven only while an accelerating pedal is being depressed and not driven while the accelerating pedal is not being depressed so as to enable jolting of the vehicle which occurs when the accelerating pedal is depressed and released to be diminished, in which gear up-shift and down-shift is conducted without disengaging a clutch in a synchromesh type automatic transmission so as to enable the time needed to engage and disengage the clutch to be shortened, which enables non-transmission of torque to be prevented from occurring when gears are shifted up or down owing to the clutch not being disengaged, which enables impact caused by engagement of the clutch to be eliminated, and which ensures smooth gear-shifting which does not make a driver feel as if a vehicle is losing power or speed.

Another object of the present invention is to provide an automatic change gear control means which has the same structure as that of a known synchromesh type automatic transmission except that the synchronizing devices mounted on a highest speed gear and a 2nd gear are replaced by transmitting torque varying means such as electromagnetic multiple-disk clutches and that a one-way clutch is provided in a 1st gear, and which therefore enables another parts to be used in common.

BRIEF DESCRIPTION OF THE DRAWINGS

FIG. 4 (B) is a flowchart of the shift-down operation of the automatic change gear control means of FIG. 1;

FIG. 4 (C) is a flowchart of the shift-down operation of an au change gear control means of FIG. 8;

FIG. 4 is a flowchart of the operation of a known automatic change gear control means;

DETAILED DESCRIPTION OF THE EMBODIMENTS

Figure 1:
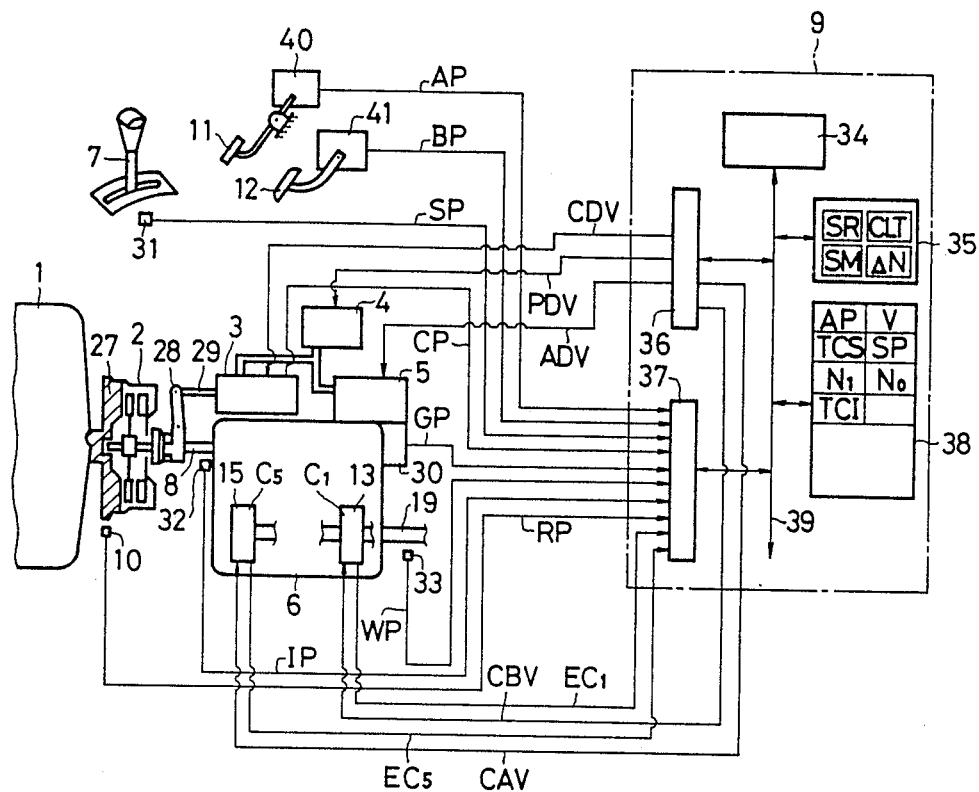
FIG. 1 is a block diagram of an automatic change gear control means, showing a first embodiment of the present invention.

A first embodiment of the present invention will be described below with reference to the accompanying drawings. Referring first to FIG. 1 which is a block diagram of a control system of an automatic change gear control means according to the present invention, a control system is subsequently the same as, for example, that employed in the automatic change gear control means which has been disclosed in Japanese Patent Laid-Open No. 60-11754 except that the former incorporates electromagnetic multiple-disk clutches and a control circuit for controlling the multiple-disk clutches, the multiple-disk clutches being provided in a highest speed gear ratio speed range which is the final speed range of a synchromesh type transmission which is to be described later (hereinafter referred to as a highest speed gear or a 5th gear) and in a lowest speed gear ratio speed range which is the final speed range (hereinafter referred to as a lowest speed gear or a 1st gear).

In FIG. 1, an engine 1 includes a throttle valve for controlling the amount of sucked gas (air or air-fuel mixture). A fly-wheel 27 is mounted on an output shaft of the engine 1. A clutch 2 which may be a friction clutch is disengaged by a release lever 28 which is moved back and forth by a piston rod 29 actuated by an actuator 3 of the clutch 2, that is, the engagement and disengagement of the clutch 2 is controlled by the actuator 3 which outputs a clutch signal CP. The clutch actuator 3 is controlled by a hydraulic device 4. A transmission actuator 5 includes an actuator 13 for actuating an electromagnetic multiple-disk clutch $C_1$ and an actuator 15 for actuating an electromagnetic multiple-disk clutch $C_5$, and outputs clutch signals $EC_1$ and $EC_5$. A synchromesh type transmission 6 includes gear trains which are changed by the drive of the actuator 5. The transmission also includes an input shaft 8 connected to the clutch 2, an output shaft 19 disposed in parallel to the input shaft 8, and a gear position sensor 30 for detecting the position of a currently engaged speed gear. A select lever 7 is operated by a driver so as to select "N" range (neutral position), "D" range (automatic change gear position), "1" range (1st speed position), "2" range (2nd speed position), "3" range (3rd speed position), or "R" range (reverse position) by positioning the lever to the corresponding position. A select signal SP which represents the selected range is output by the select sensor 31. A rotation sensor 32 is adapted to detect the rotational speed of the input shaft 8 and output an input rotational speed signal IP. A vehicle speed sensor 33 detects a vehicle speed from the rotational speed of the output shaft 19, and outputs an output rotational speed signal WP. An engine speed sensor 10 detects the speed of the engine 1 by detecting the rotational speed of the fly-wheel 27, and outputs an engine speed signal RP. An electronic control device 9 which is a microcomputer comprises a processor 34 for interpreting and executing instructions in a computer, i.e., for processing operations, a read-only memory or ROM 35 for storing a control program used to control the transmission 6 and the actuator 3 of the clutch 2, an output port 36, an input port 37, a random-access memory or RAM 38 for storing the operation results, and an address bus, that is, BUS 39 for connecting these components. The output port 36 is connected to the clutch actuator 3, the hydraulic device 4, the transmission actuator 5, the actuator 13 for the electromagnetic multiple-disk clutch $C_1$, and the actuator 15 for the electromagnetic multiple-disk clutch $C_5$, and outputs drive signals CDV, PDV, ADV, CBV, and CAV for respectively driving these components. The input port 37 receive a detection signal AP from an accelerator pedal 11 and a detection signal BP from a brake pedal 12, in addition to those from the aforementioned sensors 10, 30, 31, 32, and 33. The accelerator pedal 11 has an acceleration sensor 40 which may be a potentiometer for detecting the depression of the accelerator pedal 11. The brake pedal 12 has a brake sensor 41 for detecting the depression of the brake pedal 12.

Next, an example of a mechanism of the synchromesh type transmission 6 employed in the present invention will be hereinunder described in detail with reference to FIGS. 5, 6, and 7.

Figure 5:
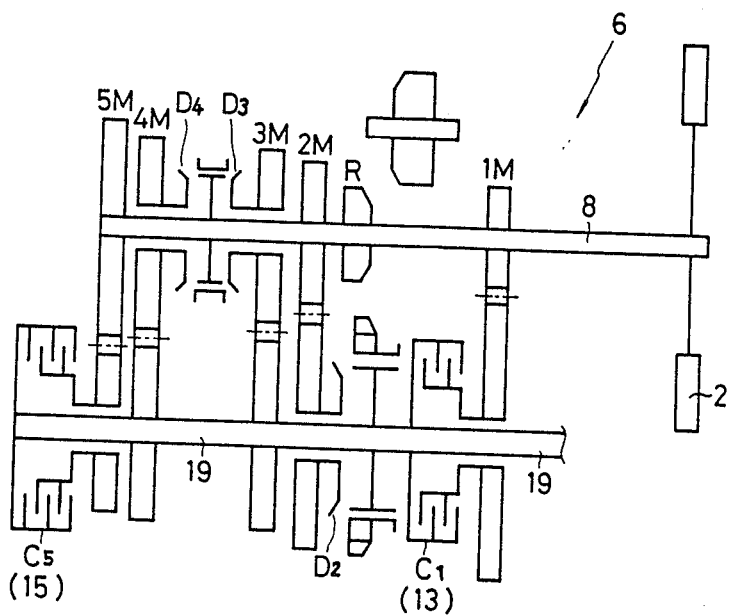
FIG. 5 is a schematic view of the essential parts of the automatic change gear control means of FIG. 1.

FIG. 5 is cross-sectional view of the essential parts of the synchromeshtype transmission 6. The transmission 6 is an assembly of a plurality of gear trains having a different number of teeth which are disposed in series between the parallel disposed input shaft 8 and the output shaft 19, and which includes a 1st speed gear train 1M, a 2nd speed gear train 2M, a 3rd speed gear train 3M, a 4th speed gear train 4M, and a 5th speed gear train 5M. The gear trains are of a constant mesh type, and are therefore mounted in such a manner that one of the gears in each gear train is fixed in the rotational direction with respect to the input shaft 8 or the output shaft 19 while other gear is rotated relative to the input shaft 8 or the output shaft 9. The input shaft 8 is mounted on a disk of the clutch 2 which may be a friction clutch in such a manner as to be rotatable together with the clutch disk. A known synchronizing device $D_2$ is mounted on the 2nd speed gear train 2M, and synchronizing devices $D_3$ and $D_4$ are mounted on the 3rd speed gear train 3M and the 4th speed gear train 4M, respectively. The electromagnetic multiple-disk clutch $C_1$ is mounted on the 1st speed gear train 1M which represents the lowest speed range, and the electromagnetic multiple-disk clutch $C_5$ is provided on the 5th speed gear train 5M which represents the highest speed range. The actuators 13 and 15 for actuating the electromagnetic multiple-disk clutches $C_1$ and $C_5$ are also provided. When the electromagnetic multiple-disk clutch $C_1$ is actuated, torque is transmitted between the 1st speed gear train 1M and the output shaft 19. Transmission of torque between the 1st speed gear train 1M and the output shaft 19 is stopped by de-energizing the electromagnetic multiple-disk clutch $C_1$. Similarly, when the electromagnetic multiple-disk clutch $C_5$ is actuated, torque is transmitted between the 5th speed gear train 5M and the output shaft 19. Transmission of torque between the 5th speed gear train 5M and the output shaft 19 is stopped by de-energizing the electromagnetic multiple-disk clutch $C_5$. Reference symbol R denotes a rear gear train.

Figure 6:
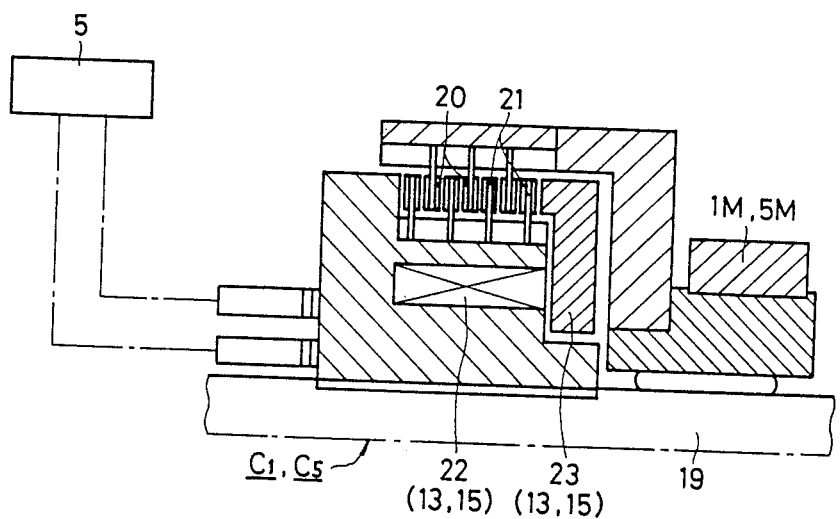
FIG. 6 is a cross-sectional view of a portion of the automatic transmission of FIG. 1 on which electromagnetic multiple-disc clutchs are mounted.
Figure 7:
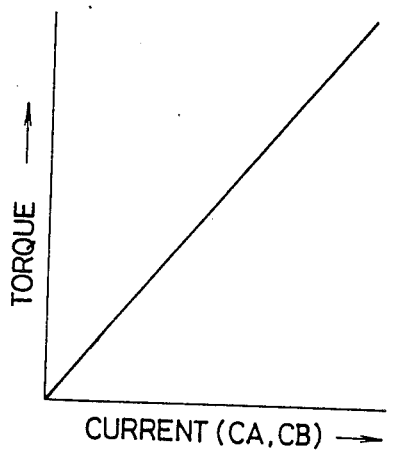
FIG. 7 is a graph, showing the characteristics of the electromagnetic clutch of the automatic transmission of FIG. 1.

FIG. 6 shows in an enlarged scale the portion of the transmission on which the electromagnetic multiple-disk clutch $C_1$ or $C_5$ is mounted. In FIG. 6, output disks 20 mounted on part of the 1st speed gear train 1M or the 5th speed gear train 5M are brought into frictional contact with inner disks 21 mounted on the output shaft 19 by an electromagnetic attracting action that takes place between a coil 22 and an armature 23 which together constitute the actuator 13 or 15 for the electromagnetic multiple-disk clutch $C_1$ or $C_5$, by which torque transmission is conducted. Amount of torque transmitted by the electromagnetic multiple-disk clutch $C_1$ or $C_5$ increases or decreases in proportion to the amount of current CB or CA that flows through the coil 22, as shown in FIG. 7. The current CB or CA is caused to flow in the actuator 13 or 15 by the signal CBV or CAV from the processor 34 so as to increase or decrease of the torque transmitted by the multiple-disk clutch $C_1$ or $C_5$ or to start or end the torque transmission.

Assuming that the processor 34 generates a shift-up signal while torque is being transmitted through the 2nd speed gear train 2M (alternatively, 3rd speed gear train 3M or a 4th speed gear train 4M), the actuator 15 for the electromagnetic multiple-disk $C_5$ is energized by the signal CAV. As the amount of current CA gradually increases, the amount of torque transmitted through the 5th speed gear train 5M increases owing to the relationship between the reduction ratios SR of the 5th speed gear train and the gear train 2M, the gear train 3M or the 4th speed gear train, and the gear engaging load on the synchronizing device $D_2$, $D_3$ or $D_4$ is therefore reduced, making the corresponding gear train loosely engaged. When the gear engaging load is decreased to a predetermined value, the transmission actuator drive signal ADV is generated from the processor 34 so as to move a sleeve of the synchronizing device $D_2$, $D_3$ or $D_4$, disengage the currently engaged gear train, and thereby make the transmission neutral. As the amount of current supplied to the actuator 15 of the multiple-disk clutch $C_5$ further increases and load to the 5th speed gear train 5M or loading torque thereof thereby further increases, the rotational speed of the input shaft 8 decreases owing to a small reduction gear ratio of the 5th speed gear train 5M. Once the rotational speed of the input shaft 8 has reduced to a predetermined value, the processor 34 again generates a transmission actuator drive signal ADV so as to smoothly engage a subsequent current to the actuator 15 for the electromagnetic multiple-disk clutch $C_5$ is stopped so as to disengage the electromagnetic multiple-disk clutch $C_5$ and thereby enable all of the torque to be transmitted by the subsequent speed gear train. The same operation is conducted when gears are shifted up from 3rd gear to 4th gear. Gear shifting from 4th gear to 5th gear is achieved by bringing the electromagnetic multiple-disk clutch $C_5$ into complete engagement. Gear shift-down is conducted in the same principle and in the same manner as that in which shift-up operations are performed except that the actuator 13 for the electromagnetic multiple-disk clutch $C_1$ is actuated in place of the actuator 15 for the multiple-disk clutch $C_5$.

Next, the operation of the automatic change gear control means of the present invention which is shown in FIG. 1 will be described below.

[1] When the select lever 7 is positioned at "D" range and the selection signal SP representing "D" range is input to the input port 37 from the position sensor 31, the processor 34 reads the selection signal through the BUS 39, stores it in the RAM 38, and outputs the drive signal ADV from the output port 36 to the actuator 5 of the transmission 6 so as to drive the actuator 5 and thereby shift the transmission 6 to a 1st gear.

[2] Next, the processor 34 receives a gear position signal GP from the gear position sensor 30, thereby detects that the transmission 6 has been actually shifted to 1st gear, and stores the received signal in the RAM 38 as a TCS.

Figure 3:
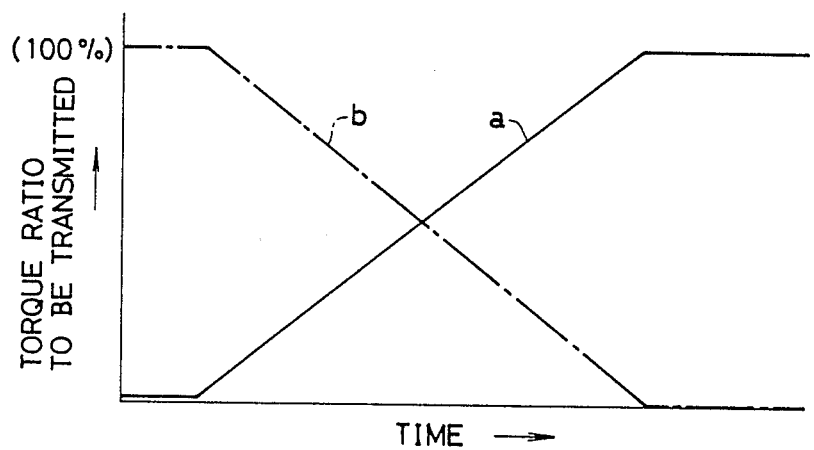
FIG. 3 is a graph, explaining the operation of a clutch.

[3] Subsequently, the processor 34 outputs a clutch drive signal CDV to the actuator 3 for the clutch 2 through the output port 36 in order to have the piston rod 29 gradually moved leftward by the actuator 3 and thereby move the release lever 28 gradually in the leftward direction. Thus torque to be transmitted by the clutch 2 varies, as shown by a symbol indicated by "a" in the graph of FIG. 3, and the clutch 2 becomes engaged after passing through a semiengaged state so as to cause the vehicle to start moving. A symbol "b" in FIG. 3 denotes a case where the clutch 2 which has been engaged becomes disengaged after passing through a semiengaged state.

Figure 2:
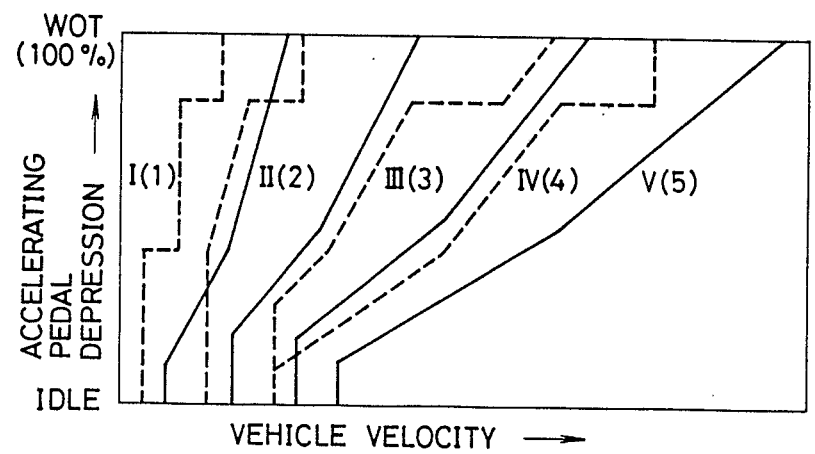
FIG. 2 explains the shift-up and shift-down operations which are carried out in the present invention.

[4] Thereafter, the processor 34 cyclically receives a detection signal (a detection pulse) from the vehicle speed sensor 33 through the input port 37, calculates the vehicle speed V, and stores the result in the RAM 38 as V. The processor 34 also receives a detection signal, i.e., a depression AP, with respect of the accelerator pedal 11 from the sensor 40 through the input port 37, stores it in the RAM 38 as AP, and obtains a gear to be shifted to from a shift map SM which is stored in the ROM 35 as part of the program thereof and which corresponds to vehicle speed SP and depression AP. More specifically, the ROM 35 stores a position signal CLT with respect of the actuator 3 for the clutch 2, reduction ratios SR of the respective gear trains, and a rotational speed tolerance $\Delta P$ of the input shaft 8, in addition to the shift map SM such as that shown in FIG. 2 which corresponds to vehicle speed SP and depression AP. In FIG. 2, symbols I (1), II (2), III (3), IV (4), and V (5) respectively designate the 1st speed range, the 2nd speed range, the 3rd speed range, the 4th speed range, and the 5th speed range. The solid lines in the figure denote boundaries of the speed ranges which are used when gears are shifted up, and the dotted lines designate boundaries of the speed ranges which are used when gears are shifted down. A subsequent speed gear TCI can be obtained from the depression AP and the vehicle speed SP.

[5] Next, the processor 34 compares the currently selected gear TCS which is stored in the RAM 38 with the obtained gear, and, if they are the same, proceeds to a subsequent processing without generating the drive signal ADV. If they are not the same, it is determined whether or not gears should be shifted up or down. If gears must be shifted up, the operation process in the flowchart of FIG. 4 (A) which will be described later is executed in order to change gear to the required gear. In a case of shift-down, the process in the flowchart of FIG. 4 (B) which will be described later is executed.

The gear shift operation which is to be performed when gears are shifted up will be described first.

[1] Once the processor 34 receives a gear shift-up instruction, it outputs an electromagnetic multiple-disk clutch drive signal CAV to the actuator 15 of the clutch $C_5$ through the output port 36, by which a gradually increasing current CA is supplied to the actuator 15 of the electromagnetic multiple-disk clutch $C_5$ which is mounted on the highest speed gear, i.e, the 5th speed gear, of the synchromesh type transmission 6. As the amount of current supplied to the actuator 15 gradually increases (DCA), the amount torque (TP) transmitted through the electromagnetic multiple-disk clutch $C_5$ increases, and data representing the increasing torque TP is stored in the RAM 38 of the processor 34 through the input port 37. When the processor 34 determines that the torque TP transmitted by the electromagnetic multiple-diskclutch $C_5$ has reached a predetermined value and that the load applied to the currently engaged gear train has therefore become smaller than a predetermined value stored in the ROM 35, it outputs a drive signal ADV to a shifting actuator within the actuator 5 of the transmission 6 through the output port 36 so as to disengage the currently engaged gear train.

[2] The processor 34 detects from a gear position signal GP of the gear position sensor 30 that the detection signal has been turned on, and thereby detects that the transmission 6 has been placed in neutral.

[3] Concurrently with the above-described detection operations, the processor 34 reads a subsequent speed gear TCI from the RAM 38, reads from the ROM 35 the reduction gear ratio i of the subsequent speed change gear and the reduction gear ratio $i_f$ of the final speed change gear, and performs the following calculation using the gear ratios as well as the vehicle speed V in the RAM 38 so as to obtain an optimum engine speed $N_1$ needed to change gears to the subsequent speed change gear TCI:

$$N_1 = \frac{V \cdot i \cdot i_f}{R}$$

where R represents the radius of a tire. The thus-obtained optimum engine speed $N_1$ is stored in the RAM 38.

[4] The amount of current CA supplied to the actuator 15 of the electromagnetic multiple-disk clutch $C_5$ is now gradually increasing. Therefore, the torque transmitted by the clutch $C_5$, i.e., the torque loaded thereto, increases, and the speed of the engine 1, i.e., the rotational speed $N_0$ of the input shaft 8, decreases. The processor 34 receives through the input port 37 a detection pulse IP from the rotation sensor 32, calculates the rotational speed $N_0$ of the input shaft 8 from the detection pulse IP, and stores the result in the RAM 38. [5] Next, the processor 34 reads the engine speed $N_1$ and the rotational speed $N_0$ of the input shaft 8 from the RAM 38, and calculates an equation which is $N = N_0 - N_1$. Also, the processor 34 reads from the ROM 35 the rotational speed tolerance $\Delta N$ which is set with both the capacity of the synchronizer and the allowable minimum impact imparted by shifting gears taken into consideration, and compares the difference in the rotational speed N with $\Delta N$. $\Delta N$ is set for each speed gear, and therefore differs for each gear. The most suitable value for $\Delta N$ is selected by the processor 34 in accordance with the relevant conditions.

[6] If it has been determined that $N < \Delta N$, i.e., that $N_0 - N_1 < \Delta N$, the processor 34 outputs again the drive signal ADV to the transmission actuator 5 through the output port 36, by which means the synchronizing device $D_2$, $D_3$ or $D_4$ of the transmission 6 is driven through a suitable hydraulic circuit so as to enable gears to be shifted up to the subsequent speed gear.

[7] The processor 34 recognizes a detection signal from the gear position detection signal GP which is input through the input port 37 from the gear position sensor 30 and hence that a gear-shift has taken place. At the same time, the processor 34 outputs a signal through the output port 36 so as to break off the electromagnetic multiple-disk clutch drive current, i.e., to reduce CA to zero. In consequence, load applied to the electromagnetic multiple-disk clutch $C_5$, i.e., the torque applied thereto, is released.

[8] Thus, the gears in the transmission 6 are shifted to a higher speed, and the vehicle runs in that state. The processor 34 replaces the currently engaged speed gear TCS in the RAM 38 with the subsequent speed gear TCI, thereby completing the gear shift-up operation.

Next, down-shift operation will be described. Down-shift operation is substantially the same as the up-shift operation, and is performed as follows:

[1] Once the processor 34 recognizes a gear shift-down instruction, it outputs an electromagnetic multiple-disk clutch drive signal CAV to the actuator 15 of the clutch $C_5$ through the output port 36, by which a gradually increasing current CA is supplied to the actuator 15. As the amount of current supplied to the actuator 15 gradually increases (DCA), the amount of torque (TP) transmitted through the electromagnetic multiple-disk clutch $C_5$ increases, and data representing the increasing torque TP is stored in the RAM 38 of the processor 34 through the input port 37. When the processor 34 determines that the torque TP transmitted by the electromagnetic multiple-disk clutch $C_5$ has reached a predetermined value and that the load applied to the currently engaged gear train has therefore become smaller than a predetermined value stored in the ROM 35, it outputs a drive signal ADV to a shifting actuator within the actuator 5 of the transmission 6 through the output port 36 so as to disengage the currently engaged gear train.

[2] The processor 34 detects from a gear position signal GP of the gear position sensor 30 that the detection signal has been turned on, and thus disengages the synchronizing deice $D_2$, $D_3$ or $D_4$ without disengaging the clutch 2 in a state where the actuator 15 for the clutch $C_5$ is energized. Subsequently, the processor 34 detects that the transmission 6 has become neutral. The processor then de-energizes the actuator 15 and thereby reduces the current CA supplied thereto to zero. Next, the processor 34 energizes the electromagnetic multiple-disk clutch $C_1$ mounted on the lowest speed gear, i.e., the 1st gear train 1M, and thereby causes current Cb to flow therein so as to increase the rotational speed $N_0$ of the input shaft 8.

[3] Concurrently with the above-described detection operations, the processor 34 reads a subsequent gear TCI from the RAM 38, reads from the ROM 35 the reduction gear ratio i of the subsequent speed change gear and the reduction gear ratio $i_f$ of the final speed change gear (the 1st speed gear), and performs the following calculation using the gear ratios as well as the vehicle speed V in the RAM 38 so as to obtain an optimum engine speed $N_1$ needed to change gears to the subsequent gear TCI:

$$N_1 = \frac{V \cdot i \cdot i_f}{R}$$

where R represents the radius of a tire. The thus-obtained optimum engine speed $N_1$ is stored in the RAM 38.

[4] The amount of current CB supplied to the electromagnetic multiple-disk clutch $C_1$ is non-gradually increasing (as increments of current DCB). Therefore, the torque transmitted by the clutch $C_1$, i.e., the torque loaded thereto, increases, and the speed of the engine 1, i.e., the rotational speed $N_0$ of the input shaft 8, thereby increases. The processor 34 receives through the input port 37 a detection pulse IP from the rotation sensor 32, calculates a rotational speed $N_0$ of the input shaft 8 from the detection pulse IP, and stores the result in the RAM 38.

[5] Next, the processor 34 reads the engine speed $N_1$ and the rotational speed $N_0$ of the input shaft 8 from the RAM 38, and calculates an equation which is $N=N_1-N_0$. Also, the processor 34 reads from the ROM 35 the rotational speed tolerance $\Delta N$ which is set with both the capacity of the synchronizing device and the allowable minimum impact imparted by shifting gears taken into consideration, and compares the difference in the rotational speed N with $\Delta N$. $\Delta N$ is set for each speed gear, and therefore differs for each gear. The most suitable value for $\Delta N$ is selected by the processor 34 in accordance with the relevant conditions.

[6] If it has been determined that the $N_1-N_0 < \Delta N$, the processor 34 outputs again the drive signal ADV to the transmission actuator 5 through the output port 36, by means which the transmission 6 is driven through a suitable hydraulic circuit so as to enable gears to be shifted down to the subsequent speed gear TCI.

[7] The processor 34 recognizes a detection signal from the gear position detection signal GP which is input through the input port 37 from the gear position sensor 30 and hence that a gear shift has taken place. At the same time, the processor 34 outputs a signal through the output port 36 so as to break off the electromagnetic multiple-disk clutch drive current. In consequence, a load applied to the electromagnetic multiple-disk clutch $C_1$, i.e., the torque applied thereto, is released, and CB is reduced to zero, thereby completing the gear shifting drive operation.

[8] Thus, the gears in the transmission 6 are shifted to a lower speed, and the vehicle runs in that state. The processor 34 replaces the currently engaged speed gear TCS in the RAM 38 with the subsequent speed gear TCI, thereby completing the gear shift-down operation.

Figure 8:
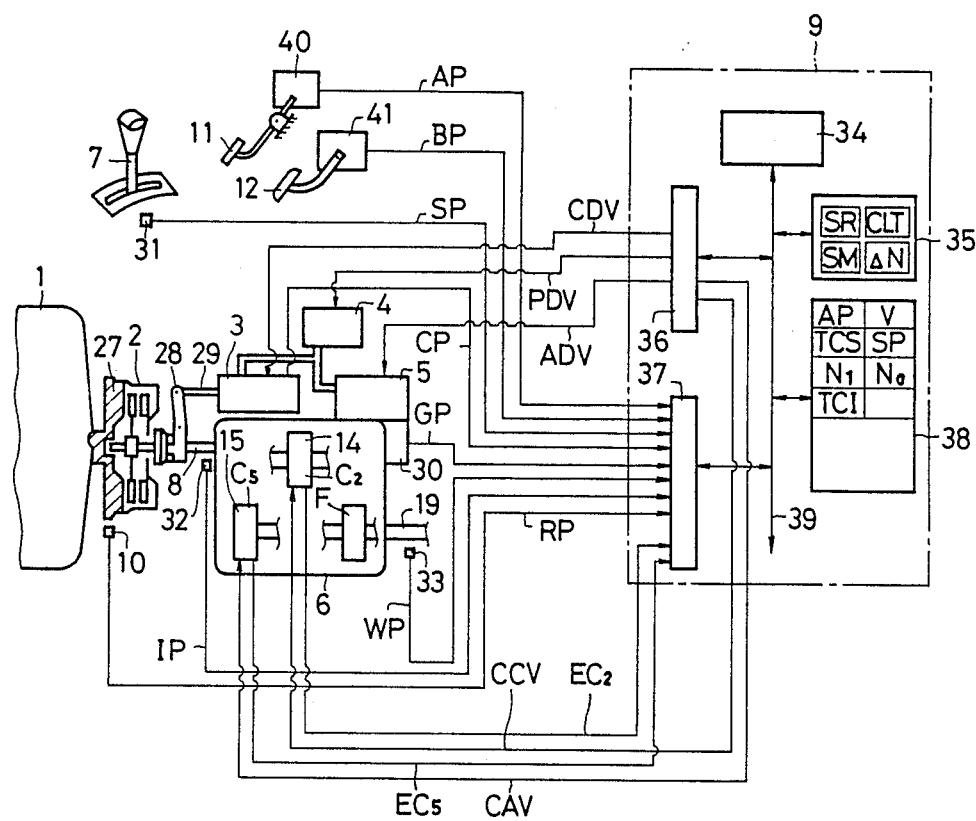
FIG. 8 is a block diagram of an automatic change gear control means, showing a second embodiment of the present invention.

Next, a second embodiment of the present invention will be described below with reference to FIG. 8. The structure of the second embodiment is the same as that of the first embodiment except for an electromagnetic multiple-disk clutch $C_2$ provided in a gear ratio speed range subsequent to the lowest speed range (1st speed gear) (hereinafter referred to as a speed gear subsequent to the lowest speed gear or a 2nd speed gear), a one-way clutch F provided in the 1st speed gear, i.e., in the 1st gear train, and a control circuit for controlling these components. Therefore, the parts which are identical to those in the first embodiment have the same reference numerals, and description thereof is simplified. FIG. 8 is a block diagram of a control system of the second embodiment.

The reference numerals in FIG. 8 which are the same as those in FIG. 1 denote the same parts or the same functions, description thereof being omitted. The actuator 5 of the transmission 6 includes an actuator 14 for actuating an electromagnetic multiple-disk clutch $C_2$, and the actuator 15 for actuating the electromagnetic multiple-disk clutch $C_5$, and outputs clutch signals $EC_2$ and $EC_5$ The output port 36 is connected to the actuator 3 of the clutch 2, the hydraulic device 4, the actuator 5 for the transmission 6 and the actuators 14 and 15, and outputs drive signals PDV, ADV, CCV and CAV.

Figure 11:
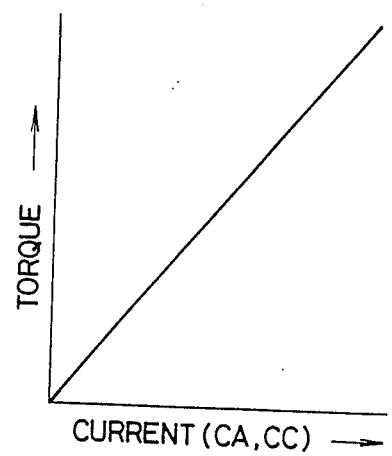
FIG. 11 is a graph, showing the characteristics of the electromagnetic clutch of the automatic transmission FIG. 8.

Next, an example of a mechanism of the synchromesh type transmission 6 will be described with reference to FIGS. 9, 10 and 11.

Figure 9:
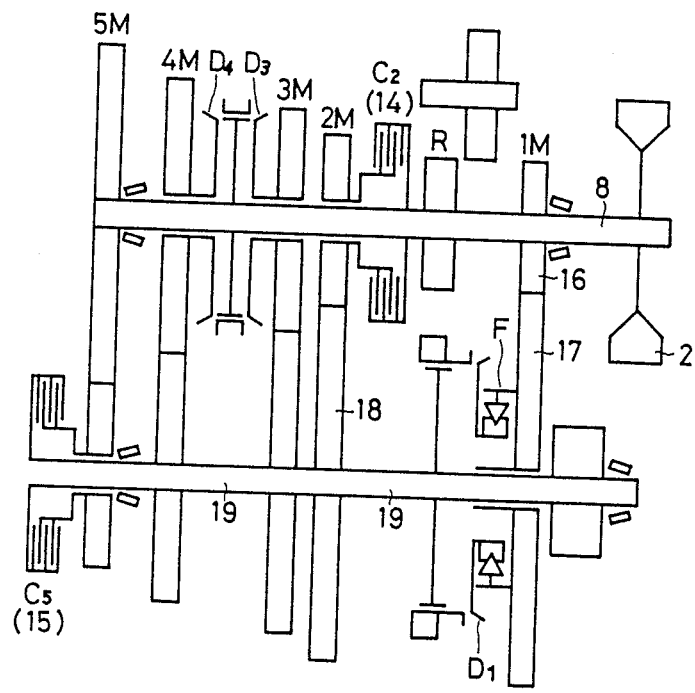
FIG. 9 is a schematic view of the essential parts of the automatic transmission of FIG. 8 which is of change gear type.
Figure 10:
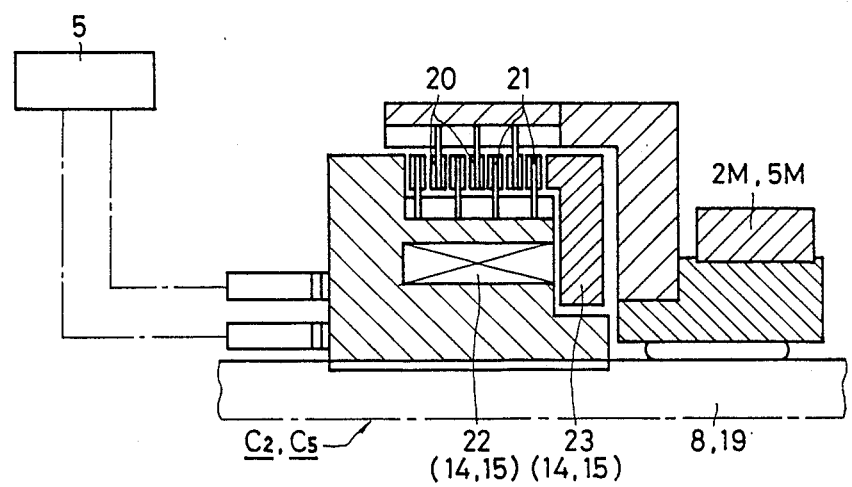
FIG. 10 is a cross-sectional view of a portion of the automatic transmission of FIG. 8 on which electromagnetic multiple-disc clutches are mounted.

FIGS. 9 and 10 are cross-sectional views of the synchromesh type transmission 6 of the present invention in which the parts identical to those in FIG. 5 are indicated by the same reference numerals and description thereof is omitted. A known synchronizing device $D_1$ is mounted on the 1st speed gear train 1M, and the electromagnetic multiple-disk clutch $C_2$ is mounted on the 2 nd gear train 2M while the electromagnetic multiple-disk clutch $C_5$ is provided in the 5th gear train 5M. The actuator 14 for actuating the electromagnetic multiple-disk clutch $C_2$ and the actuator 15 for actuating the electromagnetic multiple-disk clutch $C_5$ are also provided. When the electromagnetic multiple-disk clutch $C_2$ is energized, torque is transmitted between the 2nd gear train 2M and the input shaft 8. Transmission of torque between the 2nd gear train 2M and the input shaft 8 is stopped by de-energizing the electromagnetic multiple-disk clutch $C_2$. Similarly, when the electromagnetic multiple-disk clutch $C_5$ is actuated, torque is transmitted between the 5th gear train 5M and the output shaft 19, and transmission of torque between the 5th gear train 5M and the output shaft 19 is stopped by de-energizing the electromagnetic multiple-disk clutch $C_5$. FIG. 10 shows the essential parts of the portion of the transmission on which the electromagnetic multiple-disk clutches $C_2$ and $C_5$ are mounted. These parts have the same structural configuration as those shown in FIG. 6. The electromagnetic multiple-disk clutches $C_2$ and $C_5$ are capable of transmitting torque while varying it, as shown in FIG. 11, and the amount of torque transmitted increases in proportion to current CC or CA supplied to the coil 22. More specifically, the current CC and CA are supplied to the actuators 14 and 15 for the electromagnetic multiple-disk clutches $C_2$ and $C_5$ by the signals CCV and CAV from the processor 34, by which the torque transmitted is increased and decreased and transference of torque is started and broken off. The function of the essential parts is the same as that in FIG. 6.

Next, the operation of the automatic change gear control means of the present invention which is shown in FIG. 8 will be described below. The operation is similar to that of the control means shown in FIG. 1, and description of the same operation is omitted.

Figure 4:
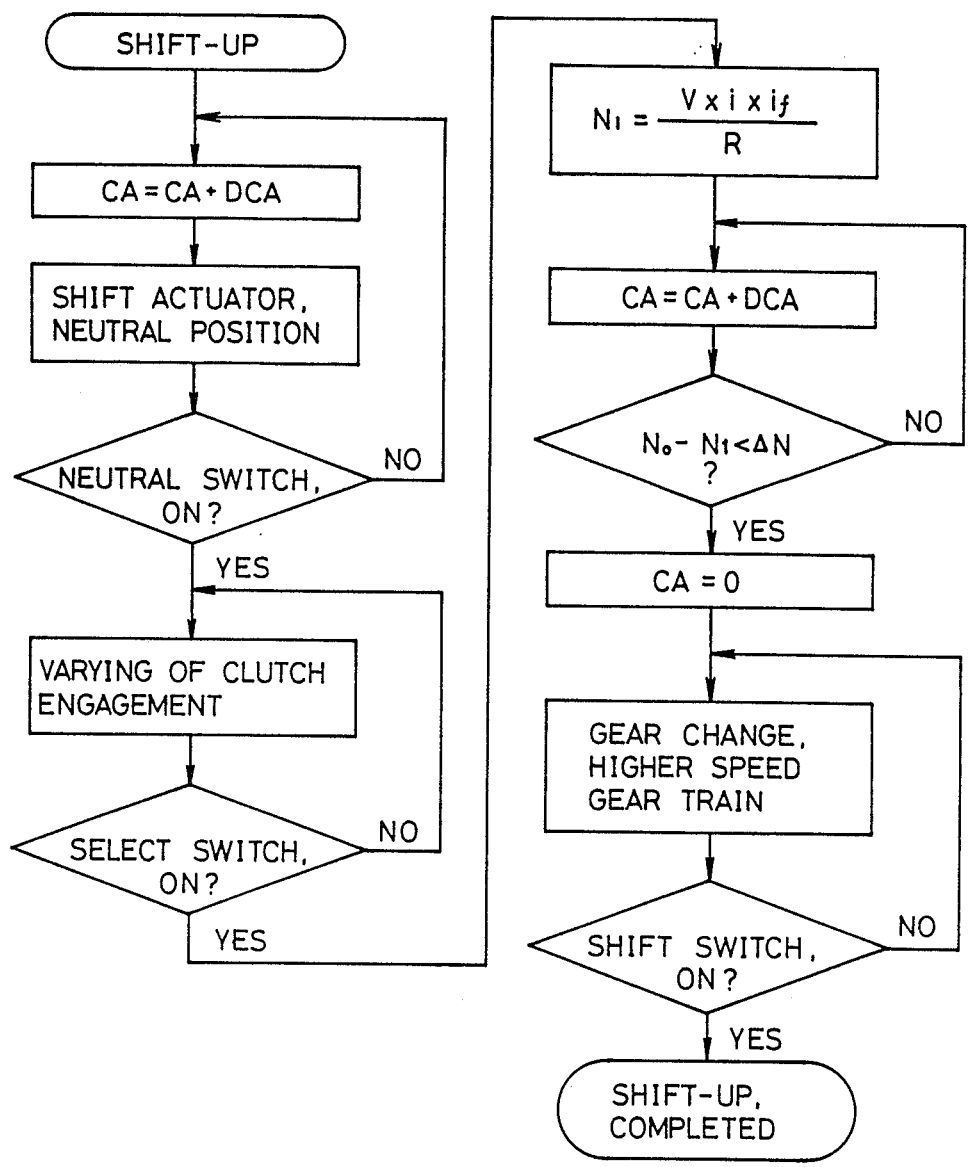
FIG. 4 (A) is a flowchart of the shift-up operation of the automatic change gear control means of FIG. 1.
Figure 4:
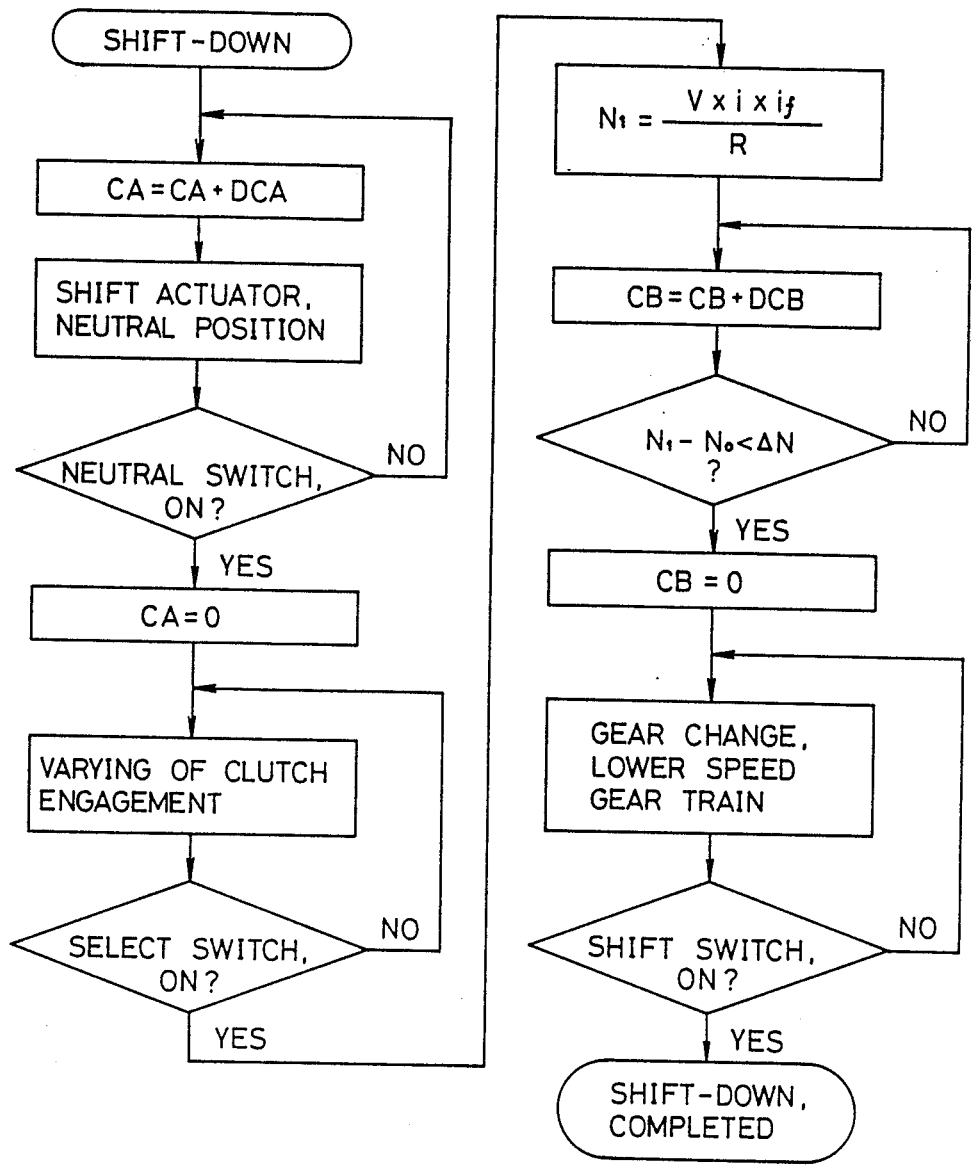
Figure 4:
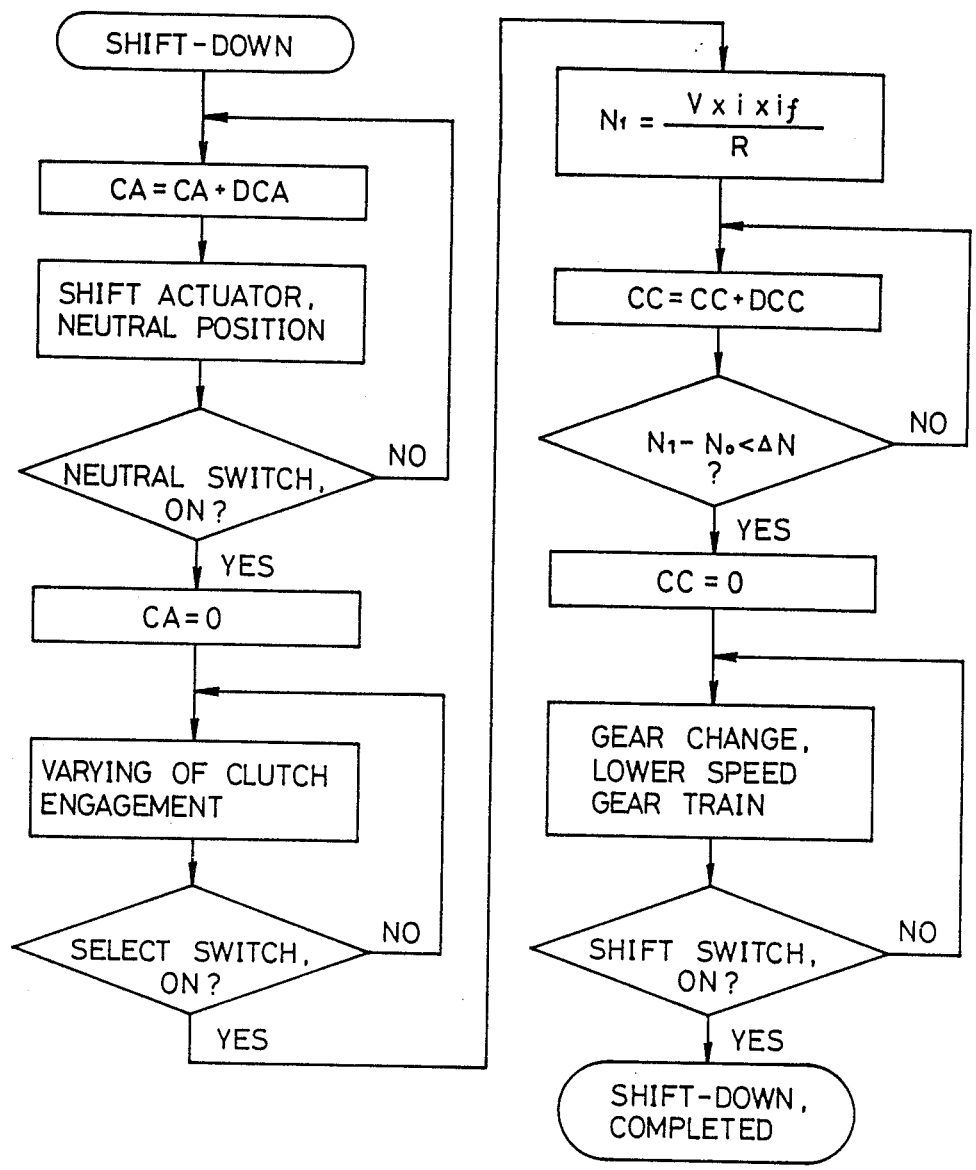

Up-shift operation between the 2nd speed gear and the highest speed gear which is the 5th speed gear is the same as that shown in the flowchart in FIG. 4 (A).

Down-shift operation between the highest speed gear which is the 5th speed gear and the 2nd speed gear will be described. This is substantially the same as that performed when gears are shifted up and as well as that of the control means shown in FIG. 1 except that the electromagnetic multiple-disk clutch $C_1$ is replaced by the electromagnetic multiple-disk clutch $C_2$, and that the current CB supplied to the actuator 13 for the electromagnetic multiple-disk clutch $C_1$ and the increments DCB thereof are respectively replaced by the current CC supplied to the actuator 14 for the electromagnetic multiple-disk clutch $C_2$ and the increments thereof DCC. The gear shifting-down operation is shown in the flowchart in FIG. 4 (C).

Figure 12:
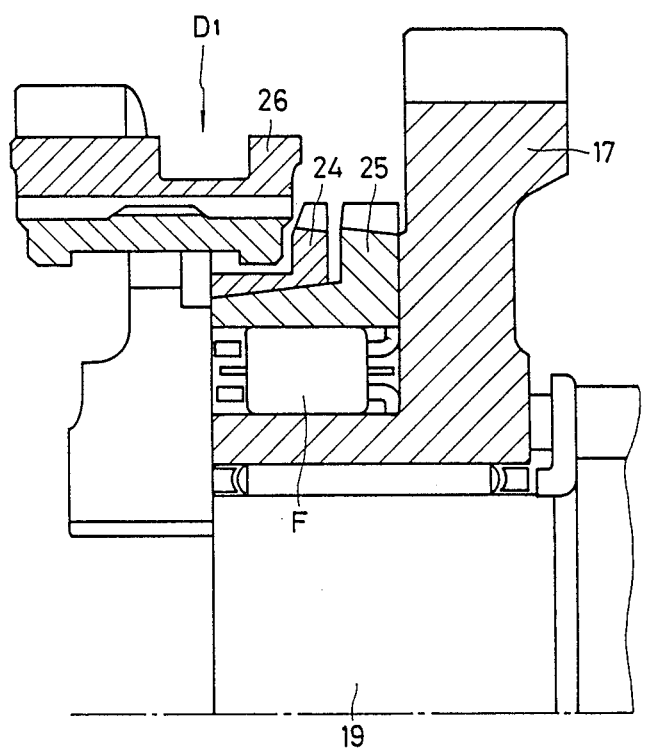
FIG. 12 is a cross-sectional view, showing a state wherein a one-way clutch is incorporated in the automatic change gear control means of FIG. 8.

In the second embodiment, the automatic change gear control means has the one-way clutch F in the 1st speed gear train 1M which is the lowest speed gear or the 1st speed gear. The one-way clutch F is incorporated in the synchronizing device $D_1$ in such a manner as shown in FIG. 12. It idles when the peripheral speed of the output shaft 19 is larger than that of a gear 17 of the 1st gear train 1M which is mounted on the output shaft 19. In FIG. 12, the synchronizing device $D_1$ also includes a blocking ring 24, a synchronizing cone 25, and a sleeve 26. In the above-described arrangement, drive in the 1st speed range, up-shift from the 1st gear to the 2nd gear and down-shift from the 2nd gear to the 1st gear will be performed in the manner described below.

[1] When the vehicle is driven in the 1st speed range, the synchronizing device $D_1$ is engaged so that the torque is transmitted from a gear 16 mounted on the input shaft 8 to the gear 17 mounted on the output shaft 19, then to the output shaft 19 through the one-way clutch F.

Figure 13:
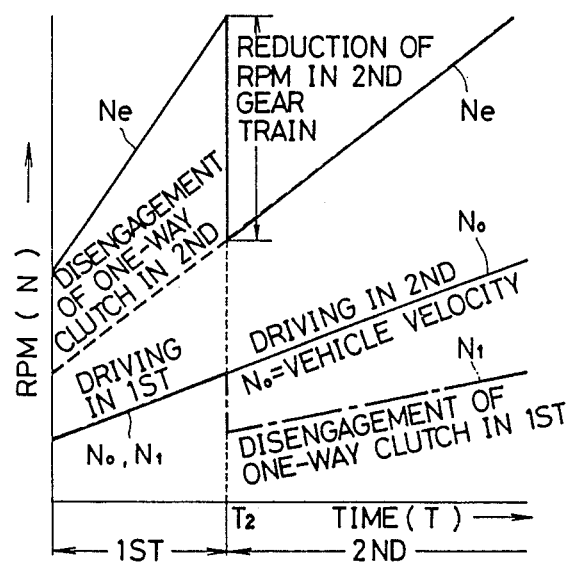
FIG. 13 is a graph, explaining the shift-up operation of the automatic change gear control means of FIG. 9.

[2] With reference to FIGS. 9 and 13, up-shift from the 1st speed range to the 2nd speed range is achieved by the engagement of the electromagnetic multiple-disk clutch $C_2$ mounted on the 2nd speed gear train 2M. More specifically, as shown in FIG. 13, after the vehicle has started running in the 1st speed range, the engine speed, i.e., the rotational speed $N_e$ of the input shaft 8 increases, thereby increasing the rotational speed of the gear 16 of the 1st speed gear train 1M and the $N_1$ of the gear 17. At this time, the electromagnetic multiple-disk clutch $C_2$ mounted on the 2nd gear train 2M is not yet engaged, and a gear 18 of the 2nd speed gear train 2M which is mounted on the output shaft 19 is idling. The electromagnetic multiple-disk clutch $C_2$ becomes engaged such that torque is transmitted therethrough when the rotational speed $N_1$ of the gear 17, i.e., the rotational speed $N_0$ of the output shaft 19, exceeds a predetermined value (at a point $T_2$). In consequence, the rotational speed $N_e$ of the input shaft 8, i.e., the torque transmitted temporarily reduces, then increases again. This increases the rotational speed $N_0$ of the output shaft 19 and the increased rotational speed $N_0$ causes the one-way clutch F to idle, completing gear shift operation from the 1st to 2nd. In other words, when the electromagnetic multiple-disk clutch $C_2$ is engaged and the torque loaded thereto thereby, gradually increases, the rotational speed of the input shaft 8 reduces, and the rotational speed $N_1$ of the gear 17 in the 1st gear train 1M which is mounted on the output shaft 19 becomes smaller than the rotational speed $N_0$ of the output shaft 19, causing the one-way clutch F to idle. Subsequently, the electromagnetic multiple-disk clutch $C_2$ becomes completely engaged, thereby completing the gear shift operation from 1st to 2nd.

[3] The down-shift from 2nd to 1st is just reverse to that described above, and is achieved only by the disengagement of the electromagnetic multiple-disk clutch $C_2$ mounted on the 2nd gear train 2M. More specifically, when the electromagnetic multiple-disk clutch $C_2$ is disengaged, the opening of a throttle valve becomes large owing the kick-down, increasing the engine speed. This increases the rotational speed $N_1$ of the gear 17 in the 1st gear train 1M which is mounted on the output shaft 19 up to a value which is larger than the rotational speed $N_0$ of the output shaft 19. In consequence, the one-way clutch F is locked, i.e., it is engaged, thereby completing down-shift from 2nd to 1st and enabling torque to be transmitted in the 1st speed range.

Figure 14:
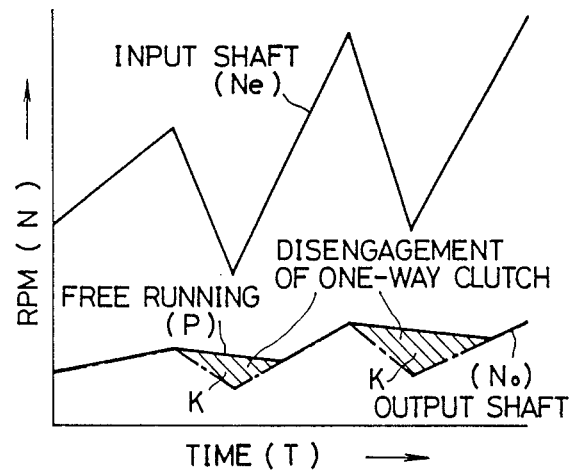
FIG. 14 a graph, illustrating the r.p.m. of an output shaft and an input shaft when an accelerating pedal of the automatic change gear control means of FIG. 8 is depressed and released.

FIG. 14 is a graphic representation of the relationship between rotational speed $N_e$ of the input shaft 8 and rotational speed $N_0$ of the output shaft 19 which is obtained when the accelerating pedal is depressed and released while the vehicle is running in the 1st speed range. As the rotational speed $N_e$ of the input shaft 8 varies by the depression and release of the accelerating pedal, the one-way clutch F idles in hatched portions K of the rotational speed $N_0$ of the output shaft 19 in the graph. While the accelerating pedal is being released, the output shaft 19 is not driven and the vehicle runs smoothly without generating jolting, as indicated by P in the graph. In other words, the output shaft is driven by the engine only when the accelerating pedal is depressed, and is not driven and the vehicle runs free while the accelerating pedal is being released, thus allowing jolting of the vehicle caused by the depression and release of the accelerating pedal to be diminished.

Figure 15:
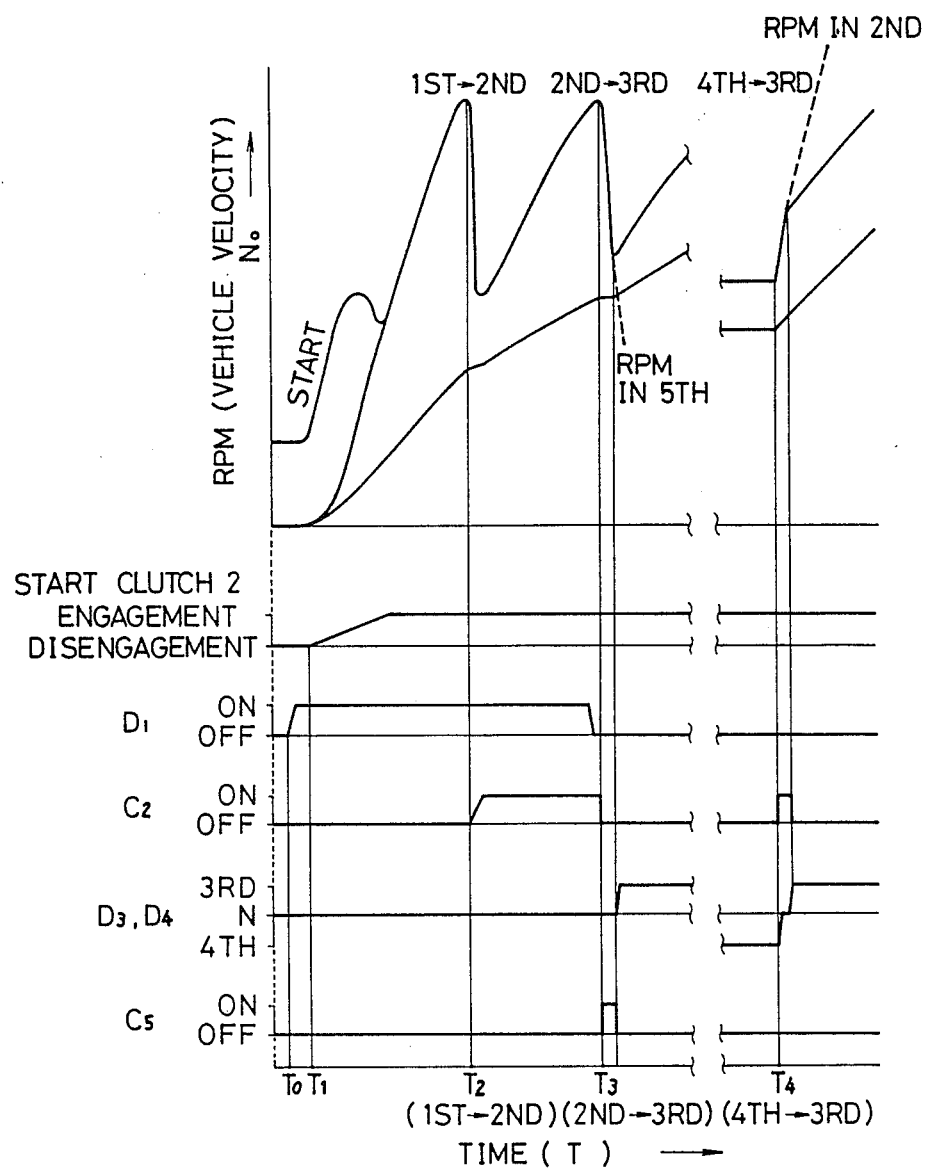
FIG. 15 a graphic representation of the concept of the automatic change gear control means of FIG. 8.

The gear-shift operation performed by the second embodiment will be described in a generallized form with reference to FIG. 15. When gears are to be shifted up, the synchronizing device $D_1$ of the 1st gear train 1M is actuated (at a time $T_0$), and the clutch 2 which serves as a starting clutch is then engaged (at a time $T_1$), upon which the one-way clutch F is engaged and the vehicle starts running in the 1st speed range. As the vehicle speed, i.e., the rotational speed $N_0$ of the output shaft 19, increases, gears are shifted up from 1st to 2nd (at a time $T_2$). At this time, the electromagnetic multiple-disk clutch $C_2$ mounted on the 2nd speed gear train 2M is energized so as to make the 1st gear train 1M idle by means of the one-way clutch F. In consequence, no time lag occurs. As the vehicle speed, i.e., the rotational speed $N_0$ of the output shaft, further increases, gears are shifted from 2nd to 3rd (at a time $T_3$) by actuating the electromagnetic multiple-disk clutch $C_5$ mounted on the 5th speed gear train 5M and causing it to load torque. Therefore, the vehicle speed, i.e., the rotational speed $N_0$ of the output shaft 19, temporarily decreases, and then increases again. In consequence, non-transmission of torque does not occur. Up-shift from 3rd to 4th is performed in the same manner as described above. Up-shift from 4th to 5th is achieved only by the engagement of the electromagnetic multiple-disk clutch $C_5$, causing no non-transmission of torque. Next, when gears are shifted down from, for example, 4th to 3rd, the electromagnetic multiple-disk clutch $C_2$ mounted on the 2nd speed gear train 2M is energized so as to enable torque to be loaded thereto. Therefore, the vehicle speed, i.e., the rotational speed $N_0$ of the output shaft 19, increases, causing no non-transmission of torque.

FIG. 4 (D) is a flowchart of the gear-shift operations of a known automatic change gear control system which is to be compared with those shown in FIGS. 4 (A), 4 (B) or 4 (C).

The present invention has been described with reference to preferred embodiments. However, obvious modifications and alterations will occur to others upon reading and understanding of this specification. For example, the clutch is not limited to a electromagnetic multiple-disk clutch but any transmitting torque varying means which is capable of varying the transmitting torque may be employed together with an actuator for actuating it, such transmitting torque varying means including a friction multiple-disk clutch, a fluid clutch, a fluid multiple-disk clutch. The intention is to include all such modifications and alterations as they come within the scope of the appended claims or the equivalent thereof.

What is claimed is:

1. An automatic change gear control means, comprising:

gear-shift means including a plurality of speed ranges which comprise a plurality of gear trains having a different number of teeth, said plurality trains being provided between an input shaft connected to a drive shaft of an engine through a clutch and an output shaft disposed in parallel with said input shaft in such a manner as to face each other, said gear-shift means being adapted to change speed ranges to any one of said plurality of speed ranges consisting o ranges between a highest speed range and a lowest speed range so that torque is transmitted from said input shaft to said output shaft in said speed range by selecting the engagement of any one of said plurality of gear trains;

a first transmitting torque varying means adapted to start and end transmission of torque between said input shaft and said output shaft at a gear train for the highest speed range, and to vary the amount of torque transmitted;

a second transmitting torque varying means adapted to start and end transmission of torque between said input shaft and said output shaft at a gear train for the lowest speed range, and to vary the amount of torque transmitted; and control means for, when gears are to be shifted, actuating said first transmitting toque varying means for synchronization, disengaging the gear train for said selected speed range, when gears are to be shifted up from a lower speed range to a higher speed range, actuating said first transmitting torque varying means so as to synchronize an engine speed to that of a subsequent speed range, and then shifting speed ranges, and when gears are to be shifted down from a higher speed range to a lower speed range, actuating said second transmitting torque varying means so as to synchronize an engine speed to that of a subsequent speed range, and then shifting speed ranges.

2. An automatic change gear control means according to claim 1, wherein said control means, when gears are to be shifted up from a lower speed range to a higher speed range by a gear-shift instruction which is generated in accordance with a vehicle speed and a depression of an accelerating pedal, actuates said first transmitting torque varying means so that torque is loaded thereto; disengages the gear train for said lower speed range; reduces the sped of said engine to that at said highest speed range by gradually increasing the torque loaded to said first transmitting torque varying means and then shifts up gears; and releases the torque loaded to said firsts transmitting torque varying means after up-shift has taken place.

3. An automatic change gear control means according to claim 1, wherein said control means when gears are to be shifted down from a higher speed range to a lower speed range by a gear-shift instruction which is generated in accordance with a vehicle speed and a depression of an accelerating pedal, actuates said first transmitting torque varying means so that torque is loaded thereto; gradually increases the amount of torque loaded to said first transmitting torque varying means and then disengages the gear train for said higher speed range; releases the torque loaded to said first transmitting torque varying means while actuating said second transmitting torque varying means so that torque is loaded thereto after said gear train has been disengaged; increases the rotational speed of said input shaft by gradually increasing the torque loaded to said second transmitting torque varying means and then shifts down gears; and releases the torque loaded to said second transmitting torque varying means after down-shift has taken place.

4. An automatic change gear control means according to claim 1, wherein the amount of torque loaded to said first and second transmitting torque varying means differs for each of the gear-shift operations that can be conducted using said gear trains.

5. An automatic change gear control means according to claim 1, wherein said gear-shift means includes synchronizing device for connecting one of the gears of part of said gear trains to said input shaft, and a synchronizing device for connecting other of the gears of said gear trains to said output shaft.

6. An automatic change gear control means according to claim 1, wherein each of said gear trains comprises a pair of constant-mesh type gears, one of said pair of gears in some of said gear trains is mounted on said input shaft in such a manner as to be rotatable relative to said input shaft, whereas the other of said gears is fixed to said output shaft in the rotational direction, and one of said pair of gears in the other of said gear trains is fixed to said input shaft in the rotational direction, whereas the other of said gears is mounted on said output shaft in such a manner as to be rotatable relative to said output shaft.

7. An automatic change gear control means according to claim 1, wherein said first transmitting torque varying means is mounted in such a manner that it can connect said gear in said gear trains which is rotatable relative to said output shaft with said output shaft.

8. An automatic change gear control means according to claim 1, wherein said second transmitting torque varying means is mounted in such a manner that it can connect said gear in said gear trains which is rotatable relative to said output shaft to said output shaft.

9. An automatic change gear control means according to claim 1, wherein said first transmitting torque varying means comprises an electromagnetic multiple-disk clutch and an actuator for actuating said electromagnetic multiple-disk clutch, said second transmitting torque varying means comprises a electromagnetic multiple-disk clutch and an actuator for actuating said electromagnetic multiple-disk clutch, and wherein the amount of torque transmitted by said electromagnetic multiple-disk clutch is proportional to the amount of current supplied to said actuator of said electromagnetic multiple-disk clutch.

10. An automatic change gear control means according to claim 1, wherein said first transmitting torque varying means and said second transmitting torque varying means each include a friction multiple-disk clutch, and an actuator for actuating said friction multiple-disk clutch.

11. An automatic change gear control means according to claim 1, wherein said first transmitting torque varying means and said second transmitting torque varying means each include a fluid clutch, and an actuator for actuating said fluid clutch.

12. An automatic change gear control means according to claim 1, wherein said first transmitting torque varying means and said second transmitting torque varying means each include a fluid friction multiple-disk clutch, and an actuator for actuating said fluid friction multiple-disk clutch.

13. An automatic change gear control means, comprising:

gear-shift means including a plurality of speed ranges which comprises a plurality of gear trains having a different number of teeth, said plurality of gear trains being provided between an input shaft connected to a drive shaft of an engine through a clutch and an output shaft disposed in parallel with said input shaft in such a manner as to face each other, said gear-shift means being adapted to change speed ranges to any one of said plurality of speed ranges consisting of ranges between a highest speed range and a lowest speed range so that torque is transmitted from said input shaft to said output shaft in said speed range by selecting the engagement of any one of said plurality of gear trains;

a first transmitting torque varying means adapted to start and end transmission of torque between said input shaft and said output shaft at a gear train for the highest speed range, and to vary the amount of torque transmitted;

a third transmitting torque varying means adapted to start and end transmission of torque between said input shaft and said output shaft at a gear train for the lowest speed range, and to vary the amount of torque transmitted;

a one-way clutch means adapted to start and end transmission of torque between said input shaft and said output shaft in a gear train for a first speed range in said gear trains and to transmit torque only in one direction; and control means for, when gears are to be shifted between said highest speed range and said 2nd speed range, actuating said first transmitting torque varying means for synchronization, disengaging the gear train for the selected speed range, when gears are to be shifted up from a lower speed range to a higher speed range, actuating said first transmitting torque varying means so as to synchronize an engine speed to that of a subsequent speed range, and then shifting speed ranges, and when gears are to be shifted down from a higher speed range to a lower speed range, actuating said third transmitting torque varying means so as to synchronize an engine speed to that of a subsequent speed range, and then shifting speed ranges.

14. An automatic change gear control means according to claim 13, wherein said control means, when gears are to be shifted up from a lower speed range to a higher speed range between said 2nd speed range and said highest speed range by a gear-shift instruction which is generated in accordance with a vehicle speed and a depression of an accelerating pedal, actuates said first transmitting torque varying means so that torque is loaded thereto; disengages the gear train for said lower speed range; reduces the speed of said engine to that at said highest speed range by gradually increasing the torque loaded to said first transmitting torque varying means and then shifts up gears; and releases the torque loaded to said first transmitting torque varying means after up-shift has taken place.

15. An automatic change gear control means according to claim 13, wherein said control means, when gears are to be shifted down from a higher speed range to a lower speed range between said highest speed range and said 2nd speed range by a gear-shift instruction which is generated in accordance with a vehicle speed and a depression of an accelerating pedal, actuates said first transmitting torque varying means so that torque is loaded thereto; gradually increases the amount of torque loaded to said first transmitting torque varying means and then disengages the gear train for said higher speed range; releases the torque loaded to said first transmitting torque varying means while actuating said third transmitting torque varying means so that torque is loaded thereto after said gear train has been disengaged; increases the rotational speed of said input shaft by gradually increasing the torque loaded to said third transmitting torque varying means and then shifts down gears; and releases the torque loaded to said third transmitting torque varying means after down-shift has taken place.

16. An automatic change gear control means according to claim 13, wherein the amount of torque loaded to said first and third transmitting torque varying means differs for each of the gear-shift operations that can be conducted using said gear train.

17. An automatic change gear control means according to claim 13, wherein said gear-shift means includes synchronizing device for connecting one of the gears of part of said gear trains to said input shaft, and a synchronizing device for connecting other of the gears of said gear trains to said output shaft.

18. An automatic change gear control means according to claim 17, wherein, said control means for actuating first and second said transmitting torque varying means includes: said electromagnetic multiple-disk clutch of said first transmitting torque varying means; means for outputting a shift-up instruction; means for energizing said actuator of said electromagnetic multiple-disk clutch so as to actuate said electromagnetic multiple-disk clutch to load a torque; means for disengaging said gear train of a speed range in which a vehicle is running; means for detecting that said gear train has become neutral; means for increasing the amount of current supplied to said actuator of said electromagnetic multiple-disk clutch and for causing said electromagnetic multiple-disk clutch to load a torque so as to reduce the rotational speed of said input shaft to that of said gear train of a subsequent speed range; means for shifting up to said subsequent speed range through said synchronizing device provided in said subsequent speed range when the rotational speed of said input shaft is reduced within a rotational speed tolerance which is set; and di-energizing said actuator of said electromagnetic multiple-disk clutch.

19. An automatic change gear control means according to claim 17, wherein, said first transmitting torque varying means comprises a first electromagnetic multiple-disk clutch whereas said second transmitting toque varying means comprises a second electromagnetic multiple-disk clutch, said control means includes: means for outputting a shift-down instruction; means for energizing said actuator of said first electromagnetic multiple-disk clutch so as to actuate said first electromagnetic multiple-disk clutch and thereby causes said first electromagnetic multiple-disk clutch to load a torque; means for disengaging said gear train of a speed range in which a vehicle is running; means for detecting that said gear train has become neutral; means for de-energizing said actuator of said first electromagnetic multiple-disk clutch; means for energizing said actuator of said second electromagnetic multiple-disk clutch so as to increase the rotational speed of said input shaft; means for shifting down to said subsequent speed range through said synchronizing device provided in said subsequent speed range when said rotational speed of said input shaft has increased within a rotational speed tolerance which is set; and means for de-energizing said actuator of said second electromagnetic multiple-disk clutch.

20. An automatic change gear control means according to claim 13, wherein each of said gear trains comprises a pair of constant-mesh type gears, one of said pair of gears in some of said gear trains is mounted on said input shaft in such a manner as to be rotatable relative to said input shaft, whereas the other of said gears is fixed to said output shaft in the rotational direction, and one of said pair of gears in the other of said gear trains is fixed to said input shaft in the rotational direction, whereas the other of said gears is mounted on said output shaft in such a manner as to be rotatable relative to said output shaft.

21. An automatic change gear control means according to claim 13, wherein said first transmitting torque varying means is mounted in such a manner that it can connect said gear in said gear trains which is rotatable relative to said output shaft to said output shaft.

22. An automatic change gear control means according to claim 13, wherein said third transmitting torque varying means is mounted in such a manner that it can connect said gear in said gear trains which is rotatable relative to said input shaft to said input shaft.

23. An automatic change gear control means according to claim 13, wherein said one-way clutch is disposed between said gear in said gear trains which is rotatable relative to said output shaft and said output shaft.

24. An automatic change gear control means according to claim 13, wherein said first transmitting torque varying means comprise an electromagnetic multiple-disk clutch and an actuator for actuating said electromagnetic multiple-disk clutch, said second transmitting torque varying means comprise an electromagnetic multiple-disk clutch and an actuator for actuating said electromagnetic multiple-disk clutch, and wherein the amount of torque transmitted by said electromagnetic multiple-disk clutch is proportional to the amount of current supplied to said actuator of said electromagnetic multiple-disk clutch.

25. An automatic change gear control means according to claim 24, wherein, when said first transmitting torque varying means comprises said electromagnetic multiple-disk clutch, said control means includes; means for outputting a shift-up instruction between said 2nd speed range and said highest speed range; means for energizing said actuator of said electromagnetic multiple-disk clutch so as to actuate said electromagnetic multiple-disk clutch and thereby cause said electromagnetic multiple-disk clutch to load a torque; means for disengaging said gear train of a speed range in which a vehicle is running; means for detecting that said gear train has become neutral; means for increasing the amount of current supplied to said actuator of said electromagnetic multiple-disk clutch and for causing said electromagnetic multiple-disk clutch to load a torque so as to reduce the rotational speed of said input shaft to that of said gear train for a subsequent speed range; means for shifting up to said subsequent speed range through said synchronizing device provided in said subsequent range when the rotational speed of said input shaft is reduced within a rotational speed tolerance which is set; and means for de-energizing said actuator of said electromagnetic multiple-disk clutch.

26. An automatic change gear control means according to claim 43, wherein, said control means for actuating transmitting torque varying means includes:
said electromagnetic multiple-disk clutch of said first transmitting torque varying means;
said electromagnetic multiple-disk clutch of said third transmitting torque varying means;
means for outputting a shift-down instruction between said highest speed range and said 2nd speed range; means for energizing said actuator of said first electromagnetic multiple-disk clutch so as to actuate said first electromagnetic multiple-disk clutch and thereby causes said first electromagnetic multiple-disk clutch to load a torque; means for disengaging said gear train of a speed range in which a vehicle is running; means for detecting a fact that said gear train has become neutral; means for di-energizing said actuator of said first electromagnetic multiple-disk clutch; means for energizing said actuator of said third electromagnetic multiple-disk clutch so as to increase the rotational speed of said input shaft; means for shifting down to said subsequent speed range through said synchronizing device provided in said subsequent speed range when said rotational speed of said input shaft has increased within a rotational speed tolerance which is set; and de-energizing said actuator of said third electromagnetic multiple-disk clutch.

27. An automatic change gear control means according to claim 13, wherein gear-shifting between the 1st speed range and the 2nd speed range in said gear trains is achieved either by actuating or non-actuating said third transmitting torque varying means provided on said 2nd speed range by the action of said one-way clutch.

28. An automatic change gear control means according to claim 13, wherein said control means actuates said third transmitting torque varying means when gears are shifted up from said 1st speed range to said 2nd speed range.

29. An automatic change gear control means according to claim 13, wherein, when said third transmitting torque varying means comprises a third electromagnetic multiple-disk clutch, said control means includes: means for energizing said actuator of said third electromagnetic multiple-disk clutch when gears are shifted up from said list speed range to said 2nd speed range; means for reducing the rotational speed of said input shaft; means for causing said one-way clutch to idle; and means for completely engaging said third electromagnetic multiple-disk clutch.

30. An automatic change gear control means according to claim 13, wherein said control means does not actuate said third transmitting torque varying means when gears are shifted down from said 2nd speed range to said 1st speed range.

31. An automatic gear control means according to claim 13, wherein, when said third transmitting torque varying means comprises a third electromagnetic multiple-disk clutch, said control means includes: means for de-energizing said actuator of said third electromagnetic multiple-disk clutch when gears are shifted down from said 2nd speed range to said 1st speed range; means for increasing the rotational speed of said input shaft; and means for engaging said one-way clutch.

32. An automatic change gear control means according to claim 13, wherein said first transmitting torque varying means and said third transmitting torque varying means each include a friction multiple-disk clutch, and an actuator for actuating said friction multiple-disk clutch.

33. An automatic change gear control means according to claim 13, wherein said first transmitting torque varying means and said third transmitting torque varying means each include a fluid clutch, and an actuator for actuating said fluid clutch.

34. An automatic change gear control means according to claim 13, wherein said first transmitting torque varying means and said third transmitting torque varying means respectively include a fluid friction multiple-disk clutch, and an actuator for actuating said fluid friction multiple-disk clutch.

* * * * *